May 8, 1951     H. P. KUEHNI     2,552,189
PAPER WEIGHT INDICATING EQUIPMENT
Filed April 27, 1946
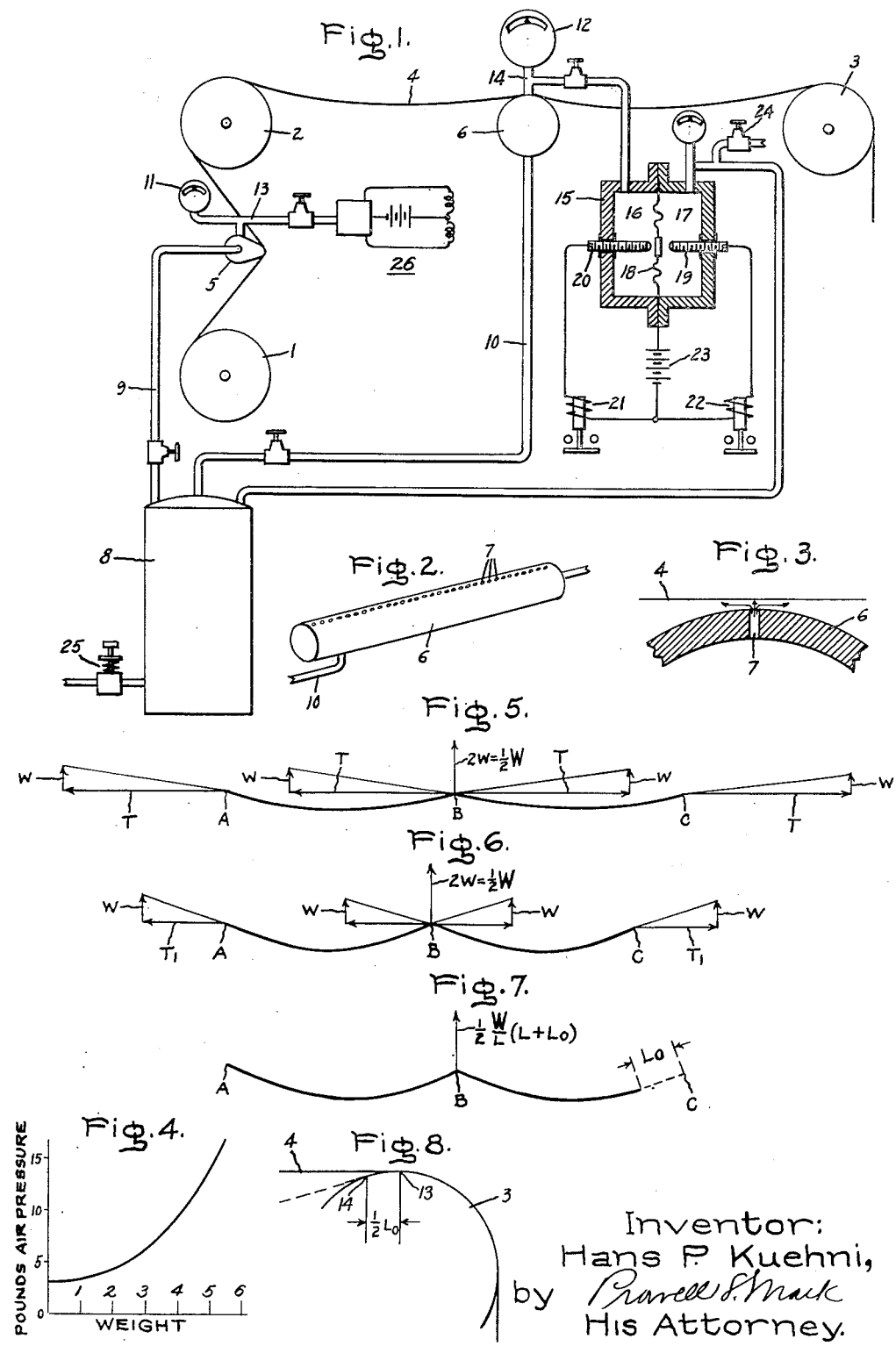
Inventor:
Hans P. Kuehni,
by His Attorney.

Patented May 8, 1951

2,552,189

UNITED STATES PATENT OFFICE 2,552,189

PAPER WEIGHT INDICATING EQUIPMENT

Hans P. Kuehni, Schenectady, N. Y., assignor to General Electric Company, a corporation of New York Application April 27, 1946, Serial No. 665,579

3 Claims. (Cl. 73—144)

My invention relates to apparatus for measuring the weight and tension of paper or other flexible sheet material, and its object is to provide relatively simple, reliable apparatus for measuring the weight or tension or both weight and tension of such sheet material without cutting off lengths of the sheet, and whether the material be stationary or passing over rollers and in motion during the process of manufacture, for example. According to my invention the sheet material is employed to impede the flow of air through orifices in the relatively flat surface of a pressure chamber toward which the sheet material is pressed with the force to be measured, such as weight or tension, tending to maintain the sheet material flat against the surface so as to keep the orifices closed. The air pressure is made such in relation to the force to be measured as to push the sheet material a limited distance away from the orifices and allow more or less escape of air, thereby decreasing the pressure in the pressure chamber. If the air supply to the pressure chamber is maintained substantially constant, a balanced condition will be reached where the pressure in the chamber becomes proportional to the desired measurement and can be measured and the pressure measurement calibrated in terms of the weight or tension of the sheet material, and used to control these factors during a continuous manufacturing process.

The features of my invention which are believed to be novel and patentable will be pointed out in the claims appended hereto. For a better understanding of my invention, reference is made in the following description to the accompanying drawings in which Fig. 1 represents an apparatus for measuring the weight and tension of paper while in motion over rollers at or near the final stage of manufacture. Fig. 2 shows a perspective top view of a pressure chamber. Fig. 3 shows a cross section of the pressure chamber through an orifice illustrating escaping air producing a lifting action on sheet material. Fig. 4 is a curve showing the character of pressure variation in a pressure chamber with varying weights of sheet material. Figs. 5, 6, and 7 are force diagrams which will be referred to in explanation of the correctness of my method of weight measurement. Fig. 8 illustrates a sag compensating feature inherent in a properly arranged weight measuring apparatus.

Referring now to Fig. 1, reference characters 1, 2, and 3 represent rollers over which sheet material 4, such as paper of a definite width, is passed as the material comes from a manufacturing mill. While the direction of paper movement over the rollers is immaterial, it will be assumed to be in the direction of the arrow adjacent thereto. The paper 4 passes over and tends to bear against stationary smooth surfaced metal pressure tanks 5 and 6. The exact shapes and dimensions of these tanks are immaterial except that they shall have relatively small volume and they shall have a smooth curved surface corresponding to the width of the paper over which the paper travels and against which the paper tends to bear. This surface may resemble somewhat that of a roller surface except that it is stationary and should be polished and of a character to produce minimum rubbing friction on the paper in case the described measuring system is not in use. The pressure chamber 5 is for paper tension measurement and the paper passes partially around its curved surface so that the paper strip is forced out of its line of travel between rollers 1 and 2 in a manner tending to press the paper to the right-hand surface of pressure tank 5 with a force proportional to the tension of the paper strip.

The tank 6 is for paper weight measurement and its upper surface is in line with the upper surfaces of rollers 2 and 3 so that the paper tends to press against chamber 6 with a force proportional to the weight of the paper between rollers 2 and 3 and is independent of paper tension. In each pressure chamber there is a line of small orifices 7 along the line of maximum contact or pressure of the paper as seen in Figs. 2 and 3 for chamber 6. While the pressure chambers may extend beyond the width of the paper, the line of orifices should be completely covered by the paper such that the paper tends to maintain the orifices closed. The interior of the pressure chambers is subjected to air pressure from a compressed air tank 8 through pipes 9 and 10 preferably having control valves therein. The pressure in tank 8 is maintained constant as by an adjustable automatic pressure maintaining supply valve 25 from an air compressor not shown. The pipes 9 and 10 in combination with the control valves in such pipes are preferably of such restricted dimensions or so set as to produce a pressure drop when air flows from tank 8 to chambers 5 and 6 under the conditions to be described. The pipes 9 and 10 may enter chambers 5 and 6 at any suitable point not interfering with the free flow of air out of the orifices 7 and the movement of the sheet 4 thereover. For instance, the pipes 9 and 10 may enter chambers 5 and 6 at their sides or ends opposite the orifices. The prevailing air pressures in the chambers 5 and 6 are measured by suitable pressure gauges 11 and 12 connected thereto as by pipes 13 and 14.

Consider now the weight measuring arrangement using chamber 6. Rollers 2 and 3 are spaced some distance apart, such as 20 feet, for ordinary paper weighing purposes. The paper may be, say, 200 inches wide. Hence, the weight of a section of paper 10 feet long and 200 inches wide is supported at the orificed upper surface of pressure chamber 6. The air pressure in tank 8 is, say, 20 pounds per square inch above atmosphere. The weight of the paper tends to close the orifices 7 and the surface of the chamber in line with these orifices is ground smooth and true, and so that a negligible amount of air would escape if the paper were resting on this smooth surface and covering the orifices. However, the orifice opening area and air pressure are made such that in relation to the range of paper weight to be measured, the paper is lifted by a small varying amount measured in thousandths of an inch depending upon the weight of the paper. This uncovers the orifices by a varying amount and allows a variable amount of air to escape, as pictured, with some exaggeration, in Fig. 3, producing a pressure drop in the supply pipe 10 and lowering the air pressure in chamber 6 accordingly. Hence, the air pressure of the chamber 6 is less than that in tank 8 by an appreciable amount and in inverse proportion to the weight of the paper. That is, with a light paper the orifices are opened more and allow more air to escape than with a heavy paper. Since the paper is of a known constant width and the length of the sheet supported on the air cushion is known and constant, the pressure gauge at 12 may be calibrated directly in units customarily used in designating the weight of paper. For weighing paper the chamber 6 may be a pipe four inches in inside diameter and the orifices may be about $\frac{1}{32}$ inch in diameter and spaced about one inch apart. The manner in which the pressure at gauge 12 will vary for different weights of paper is represented in the pressure weight curve of Fig. 4 from which it will be apparent that the relations should preferably be made such as to make use of the more sensitive upper portion of the curve, say, from 10 to 15 pounds air pressure at gauge 12. When a lightweight paper is being manufactured, the valve in supply pipe 10 may be more nearly closed, also another chamber 6 might be substituted in which the orifices are smaller or spaced farther apart as compared to equipment used when manufacturing a heavy paper.

It might appear that the accuracy of this weighing system would be interfered with by variations in tension of the sheet 4. However, this is not the case if proper precautions are taken. The most important precaution is to have the top surfaces of pulleys 2 and 3 in line with the orificed surface of pressure pipe 6. These three points do not necessarily need to be exactly level on a horizontal line or exactly evenly spaced but should be in line. The second requirement is to have the spacing between rollers 2 and 3 large in comparison with the displacement of the paper from pressure pipe 6 by the air pressure. The third requirement is not to allow wide variations in the sag in the paper between rollers 2 and 3 and pressure chamber 6. When these precautions are taken and the apparatus and relations are otherwise reasonably related and calibrated for a given range of paper weight, accurate and reliable results will be obtained. This will be apparent from a consideration of Figs. 5 to 7.

In Fig. 5 a given length L of a flexible sheet material weighing W pounds is represented as suspended at three equally spaced points A, B, and C, in line and under sufficient tension to hold the material reasonably taut. Tension is represented by the vectors T and weight by the vectors $w$ distributed as represented. $w$ represents ¼ the weight W of the sheet, and ¼W is supported at each of points A and C and ½W at point B.

Fig. 6 represents the same sheet of length L used in Fig. 5 but with the tension reduced to a value $T_1$, allowing more sag and requiring the points A, B, and C to be moved slightly closer together but still kept in line and equally spaced. It is evident that this change in tension did not vary the weight supported at point B. If points A, B, and C were not in line, this would not be true. However, by keeping the tension components T and $T_1$ at point B in line and at right angles to the weight components, variation in tension does not change the weight distribution or add or subtract from the vertical component at point B.

Fig. 7 assumes that using sheet material and spacing of points A, B, and C as in Fig. 5, we reduce the tension from T to $T_1$ and add a length of sheet material $L_0$ to make up for the extra sag. The total length of sheet material now supported is $L+L_0$, and ½ of the extra weight of the added material will be supported at B. Hence, the weight supported at B, Fig. 7, is $$\tfrac{1}{2}\frac{W}{L}(L+L_0)$$

If L=200 inches the percentage change in length for different amounts of sag is as follows:

| L | Sag in Inches | $\frac{L_0 \times 100}{L}$ |
|---|---|---|
| Inches | | Per cent |
| 200 | 0 | 0 |
| 200 | 3 | 0.1 |
| 200 | 6 | 1.0 |

Figs. 5 and 7 assume that the points of supports A and C remain a fixed distance from point B, and consequently there is elongation of the supported sheet with sag but the error is negligible if the sag is kept small or uniform. Furthermore, there is an inherent compensating feature in the apparatus in the direction of keeping the length of sheet 4 supported by pressure drum 6 constant with variations in sag as represented in Fig. 8. With no sag the point of support of the paper 4 is at 13, and with a sag corresponding to the dotted line position of the paper the point of support is at 14. Thus the point of support moves to the left with increasing sag, and the distance 13—14 can be made very closely equal to ½$L_0$. Hence, by a judicious choice of the diameter of the rollers 2 and 3 in relation to the sag variation permitted, the assumed increase in length of paper $L_0$ supported at B, Fig. 5, with increasing sag can be compensated for so that the small error produced from this cause is for all practicability eliminated entirely.

It might be supposed that the added tension of the paper sheet caused by pulling the paper over the surface of the stationary pressure chamber 6, Fig. 1, might cause error. The tension components are at nearly right angles to the weight components, and also there is negligible friction at the pressure chamber 6 because the paper floats on a cushion of compressed air and does not touch the surface of chamber 6. The out-of-line condition of this cushion of air support for the paper at 6 is so small in comparison to the length of the sheet between rollers 2 and 3 that the error caused thereby is negligible.

The weight measuring principle described applies whether the paper be in motion or be stationary. The scheme may therefore be used to control the weight of paper being produced in a continuous process. In Fig. 1 at 15 is shown in cross section a pressure sensitive contact device connected to the weight measuring pressure pipe 14. The compartment is divided into two chambers 16 and 17 by a resilient, flexible diaphragm 18 which carries contacts on either side. Chamber 16 is hermetically sealed and is exposed to the measurement pressure from pipe 14. Chamber 17 is maintained at a constant pressure. For instance, it may be open to the atmosphere. However, in order to adjust such constant pressure to calibrate the control for different conditions and weights of paper, I prefer to pipe chamber 17 to constant pressure tank 8 and to provide an adjustable vent 24 in such pipe near the entrance to chamber 17 so as to adjust the constant pressure in chamber 17 to whatever is most suitable. Also such arrangement will help to compensate the control for any variation in pressure of tank 8 should that occur accidentally. Adjustable contacts 19 and 20 are provided to cooperate with the diaphragm contacts and are adjusted to be open when the weight of paper being produced is correct. When the paper being produced becomes too light, contact 20 will be closed and when the paper becomes too heavy, contact 19 will be closed. The contacts are connected to a source of supply 23 and control relays 21 and 22 as shown. These relays may then be used to control the paper making process to maintain the weight of paper being produced between narrow limits.

The tension measuring pressure pipe at 5 and associated parts operate in the same way but are subject to the tension component of the paper rather than to the weight component. It allows the escape of air in inverse proportion to tension and, hence, the scale of the pressure measuring instrument 11 may be calibrated in terms of paper tension. To prevent appreciable friction and to allow the paper to be supported at 5 by a cushion of air under normal conditions, the surface of the pressure pipe 5 is shaped to avoid contact with the paper where no air cushion exists. Tension control may also be had as indicated at 26. The pressure measurement instruments 11 and 12 and pressure control compartments such as 16 employ closed systems and, hence, do not allow air to escape and, hence, do not produce error in the measurement and control results due to air leakage and resultant pressure drop.

While I have referred to the tension and weight measurement of paper, the principles described and the use of the apparatus are applicable to the tension and weight measurement of flexible sheet material generally, such as rubber, varnished cambric, thin sheet metal, etc. It will probably not be satisfactory for loosely woven cloth but will be for materials through which air does not pass readily, such as cloth treated for windproofing, etc.

What I claim as new and desire to secure by Letters Patent of the United States is:

1. Apparatus for measuring the weight of flexible sheet material while such material is in motion comprising a pair of horizontally spaced rollers over which the sheet material is passed, a pressure chamber located approximately midway between said rollers and having an outer surface extending adjacent to, beneath, and across the width of the sheet material and in line with said rollers such that if the sheet material were a plane it would be tangent to the rollers and outer surface of said pressure chamber, said pressure chamber having a plurality of orifices in said surface facing the sheet material such that the sheet material tends to close said orifices with a force which is proportional to the weight of the sheet material, means including a constant pressure air source for forcing air into said chamber at above atmospheric pressure, whereby air flows out of said orifices and lifts the sheet material, and means responsive to the pressure change in said chamber due to such air flow for producing an indication of the weight of such sheet material.

2. Apparatus for measuring the weight of flexible sheet material while such material is in motion comprising a pair of spaced rollers between which the sheet material is passed in a horizontal direction, a pressure chamber having a surface extending beneath, adjacent to, and across the width of said sheet material at a point midway between said rollers, said surface being tangent to a plane such as would be formed by the sheet material if stretched between the rollers without any sag, said pressure chamber having a plurality of orifices in said surface facing the sheet material such that the sheet material tends to keep the orifices closed by a force proportional to the weight of such material, means for forcing a controllable volume of air into said pressure chamber at above atmospheric pressure whereby air flows out of said orifices and lifts the sheet material therefrom, and means responsive to the pressure in said chamber calibrated in relation to the weight of the sheet material, the lifting of the sheet material due to air pressure being sufficiently small in comparison to the spacing of said rollers that the change in the tension of the sheet material due to such lifting action is negligible.

3. Apparatus for measuring the tension of flexible sheet material comprising a pair of rollers having spaced apart parallel axes between which the sheet material is stretched, a pressure chamber having a surface parallel to the axes of said rollers adapted to be pressed against one side of the sheet material between the rollers such as to force the sheet material out of line between the rollers so as to form an appreciable angle in the sheet material at such surface, said chamber having a plurality of orifices in its surface facing said sheet material such that the sheet material tends to maintain said orifices closed by tension force component, means for forcing air into said chamber at above atmospheric pressure such that air escapes through the orifices and pushes the sheet material therefrom in opposition to the tension force component of such sheet material thereby causing a reduction of air pressure in said chamber, and means responsive to changes in air pressure in said chamber due to such escape of air calibrated in relation to the tension of such sheet material.

HANS P. KUEHNI.

REFERENCES CITED

The following references are of record in the file of this patent:

UNITED STATES PATENTS

| Number | Name | Date |
| --- | --- | --- |
| 2,257,577 | Rosenberger | Sept. 30, 1941 |
| 2,343,181 | Heinz | Feb. 29, 1944 |
| 2,359,236 | Moore | Sept. 26, 1944 |
| 2,390,252 | Hayward | Dec. 4, 1945 |

FOREIGN PATENTS

| Number | Country | Date |
| --- | --- | --- |
| 442,365 | Great Britain | Feb. 5, 1936 |